United States Patent Office 2,788,899
Patented Apr. 16, 1957

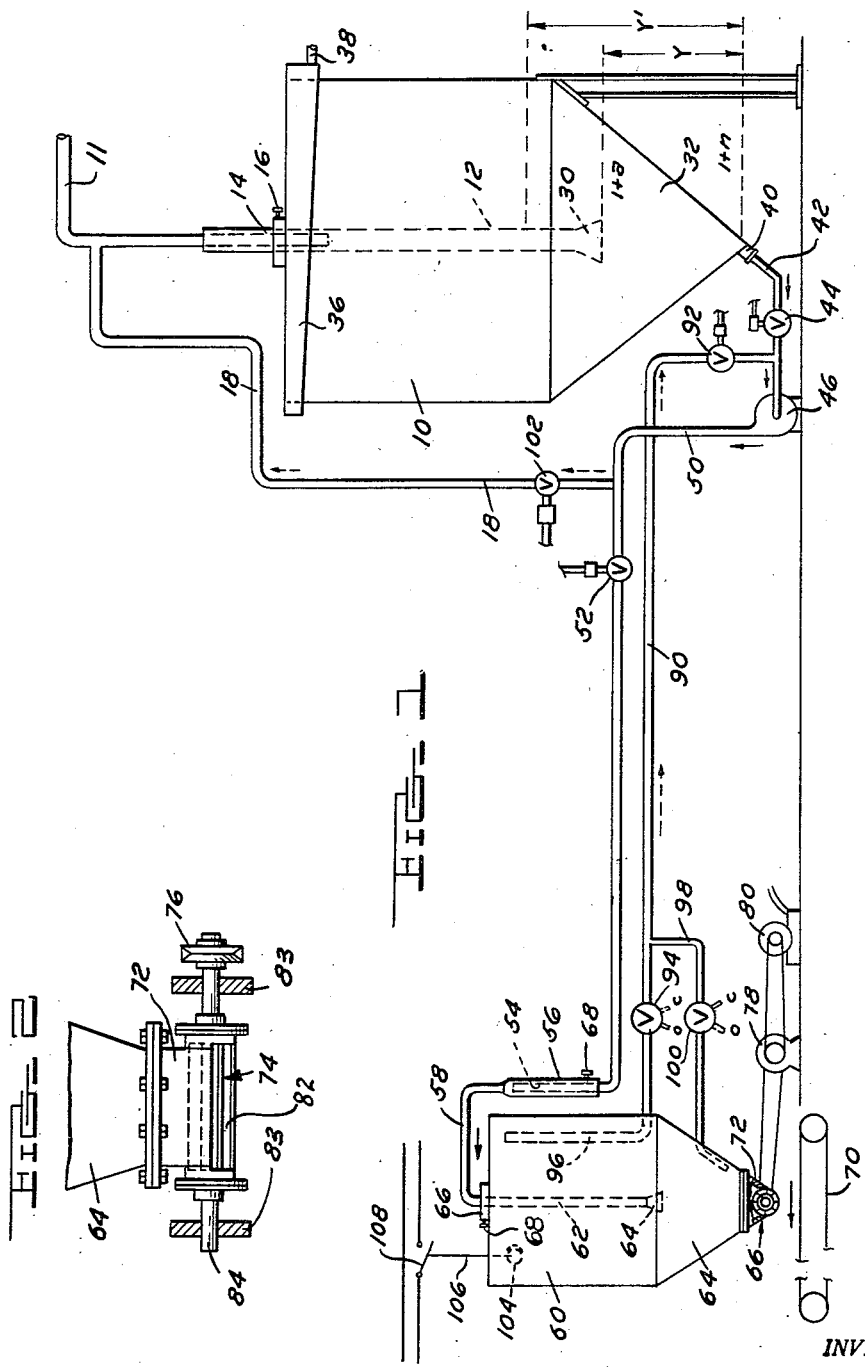

2,788,899
SYSTEM AND APPARATUS FOR TREATING SINTER SLUDGE

Martin L. Cover, Allen Park, Mich.

Application October 15, 1951, Serial No. 251,443

6 Claims. (Cl. 210—124)

This invention relates to a system and apparatus for treating sinter sludge in steel mill operation.

In the past it has been common to wash out particles from blast furnace gases and deposit the water in a wide shallow thickener tank which has a sweeping blade intended to move the material to the center of the tank where it may be removed as sludge.

This system has the disadvantage that coarse particles settle out rapidly and thus provide sludge which is very coarse at some points and fine in others. In addition, the blades do not function always to center the material and become broken by actual contact with settled sludge on the bottom of the tank.

The present invention contemplates a very simple system for recovering sludge without the use of moving parts except for the usual pumps. The system is based on the specific gravity of the sludge and contemplates the introduction of sludge into a tank at a point where the specific gravity of the settling liquid approximates the specific gravity of the entering liquid. Then, by the use of a novel velocity reducing entrance bell, the entering liquid actually increases the efficiency of the settling action.

The invention further contemplates the use of a feeder tank for additional settling action which permits sludge to be introduced directly to sinter mix of a blast furnace and avoids the need of a filter system previously needed to form filter cake.

A further object of the invention is the provision of a control system in which thin affluent liquid in a second feeder tank may be returned periodically to the main tank without interrupting the general output of sinter sludge usable on the sinter mix.

Drawings are presented to supplement the disclosure on the system of operation and also to show the apparatus, and the various views thereof may be briefly described as:

Figure 1, a partially schematic view showing the settling tank and the feeder tank and the various connecting conduits.

Figure 2, an enlarged view showing the side elevation of the lower end of the feeder tank.

Reference is made to my co-pending application Serial No. 16,101, filed March 20, 1948, now issued to Patent No. 2,539,992, dated January 30, 1951, in which I have disclosed a washer and settling tank for gases. The device disclosed in this identified application relates to a means for taking dust from blast furnace gases and recovering it in a liquid from which it is settled out in a settling tank and later used as a part of the sinter mix in the blast furnace operation.

In Figure 1 of the present disclosure, a large tank 10 receives water from a gas washer as described in the aforesaid application, said water containing the captured dust. The water can be drained into or pumped into tank 10 through a pipe 11 which has sliding engagement with an inlet tube 12 mounted for vertical adjustment in the tank 10 by a supporting collar 14 having a set screw 16. The pipe 11 has a branch conduit 18 which joins with a circuit later to be described. Pipe 12 extends downwardly into the tank 10 to a flaring discharge opening 30.

In order to have some idea of the dimensions involved, the tank 10 is about 30 feet in diameter and 25 feet high in the cylindrical portion. A conical portion 32 forms the bottom of the tank, and the vertical dimension of this conical portion is about 18 feet.

The pipe 12 has a diameter of about 15 inches, while the diameter of the flared inlet 30 is about three times that of the pipe, the vertical dimension of the flared inlet being about the same as the largest diameter. The flared inlet is shown about 5 feet into the conical portion 32, but the location of this spout will vary with the type of material being handled in a manner to be later described.

At the top of the tank an overflow drain trough 36 surrounds the tank, tapering down slightly toward an outlet pipe 38 to receive the overflow water. At the bottom of the tank an outlet connection 40 joins with a pipe 42 leading to a solenoid-operated valve 44 and to a centrifugal pump 46. The centrifugal pump 46 is of the type to handle sludge materials, and the outlet thereof is connected to a conduit 50 which passes through a solenoid-operated valve 52 to an upright portion 54.

This upright portion is telescoped by a downwardly extending pipe 56 which is one arm of a U-shaped pipe 58 leading to a feeder tank 60. The other leg of the U is an inlet pipe 62 extending downwardly into the feeder tank to a flared outlet 64. A collar 66 together with the lock bolts 68 controls the vertical position of the U-shaped member 58 and the respective legs 56 and 62.

Tank 60 has a conical bottom 64 with a special feeder outlet unit 66 shown in greater detail in Figure 2. Below the outlet 66 is a conveyor 70 for conveying sludge toward the sintering machine. The sludge is preferably dropped on top of a sinter mix which is ready to go to the pug mill, and the condition of the sludge will cause it to distribute itself evenly on the sinter mix.

The discharge unit 66 at the bottom of tank 60 comprises an end cap 72 bolted onto the bottom conical section 64, this end cap having a rectangular opening. In the rectangular opening of the end cap 72 is a feeder drum 74 which is power driven through a pulley 76 connected to a speed reducer 78 and a variable speed motor 80. The drum 74 has blades 82 extending radially therefrom to pick up the sludge from the inside of the tank and carry it out where it will fall onto the conveyor belt 70. Suitable journals 83 serve to mount the axle 84 which supports the feeder drum 74 rotatably.

There are two branch conduits in the system which have not yet been described with reference to the other portions of the system. One is a branch conduit 90 originating at pipe 42 between valve 44 and the inlet of pump 46.

The solenoid valve 92 controls this conduit 90 which leads through a hand valve 94 to an upright end portion 96 which terminates within and just below the top of tank 60. A branch conduit 98 leads from conduit 90 ahead of valve 94 through a hand valve 100 to the conical section 64 of tank 60.

Previous reference has been made to a branch 18 of pipe 11. This branch leads to the outlet 50 of the pump 46 and is open and closed by a solenoid valve 102.

In the top of tank 60 is a float 104 having an arm 106 leading upwardly to a switch 108 in an electrical circuit. This electrical circuit is associated with the solenoid valves 44, 52, 92 and 102. When switch 108 is opened as shown in the drawings, valves 44 and 52 are open while valves 92 and 102 are closed. When switch 108 is closed, valves 44 and 52 are closed and valves 92 and 102 are open.

One of the objects of the present system is a continuously operating source of sludge material for sinter mix. It should be recognized first of all that a certain amount of moist material in a sinter mix is advantageous to bind the mix together and to prevent too rapid burning.

In the past this has been provided by a filter cake obtained by directing the sludge to a filter tank, but with this old system it was necessary to have an interrupted flow of sludge whereas in the present system it is intended that the sludge may be recovered and deposited directly on sinter mix which is headed for the pug mill.

For this reason, the timing of the system is critical and continuous operation of the system is desirable as much as is possible. In addition, a much thicker sludge than is usually handled will be taken from the tank 60. This is the reason for the paddle wheel 74 which pulls the sludge out of the tank 60 and allows it to drop onto the belt 70.

It will be also seen that accurate speed control is available for this extractor or feeder drum 74 so that the speed at which it is operated can be controlled, depending on the mixture desired for the sintering.

If the specific gravity of the water that is entering the tank is designated as "$1+a$" and the specific gravity of the sludge leaving the tank is designated as "$1+n$," it is possible to work out the relationships of the different levels in the tank and to determine where the inlet 30 should be positioned relative to the bottom.

In the tank 10, as shown, the water enters at the inlet 30 which is "$y$" distance above the outlet 40. Due to the specific gravity variations, the entering water immediately spreads over the tank at the level indicated by the height "$y$." Solids settle out while the water is rising from the level "$y$" and it is desirable that as the water reaches the overflow 36 it be relatively clear.

The inlet 30 is so designed that the velocity of the entering fluid will be relatively low and will thus spread out slowly to the sides of the tank. Introducing the material to be recovered at the point "$y$" distance from the bottom means that the entire volume of the tank above this point has a specific gravity less than the liquid entering, and consequently the differential in specific gravity will cause immediate settling as the material with the lower specific gravity tends to rise. Thus, the differential increasing as it does from the point of inlet to the top of the tank, the chances of almost complete recovery of the included particles is excellent in this arrangement.

In normal operation the level of the point $y$ may rise to $y'$ as the tank is loaded so a differential exists between the inlet and the point in the tank where the specific gravity equals that of the incoming material. However, with the low inlet there is still plenty of room for efficient settling above the point $y'$ and the heavy particles are brought in at a position where they do not have to settle through thickened sludge. In other words, there is no necessity for heavy particles to settle down against a counterflow upward of lighter particles.

The settling tank as described above will take care of 2,000 gallons per minute to a clarity of about 4 grains per gallon. This tank can be used in conjunction with existing tanks to avoid segregation difficulties and will take care of up to 16,000 gallons per minute to a clarity of about 25 grains per gallon and may recover as high as 800 tons solids in 24 hours.

Another advantage of the present system is that segregation of coarse particles is avoided in the sludge being recovered. The angle of the conical bottom 32 in tank 10 preferably has a tangent value of 1 or 5/6.

With the spreading action which is accomplished by reason of the location of the inlet 30 and the shape of it, heavy material flows out and is distributed evenly as the material flows down to the outlet 40 so that there is a steady flow through the pump of a mixture of light and coarse material. At no point can the heavy material build up.

As the material leaves the tank 10 it is pumped to the tank 60, where again the inlet 64 is controlled as to its level to introduce the material at substantially the specific gravity location in the tank which corresponds to its consistency as it enters.

Additional settling, of course, will take place in tank 60; and due to the fact that continuous operation of the device is desired, a control is provided to prevent overflow of tank 60 and also to maintain the level at a certain point so that the consistency of the material leaving tank 60 will be relatively steady.

As previously pointed out, when switch 108 is open, pump 46, which is continuously operating, will supply tank 60 from tank 10. When level in tank 60 raises float 104, switch 108 will close actuating valves 44 and 52 to a closed position and open valves 92 and 102. Since valve 94 is generally open, the effect of closing switch 108 is to pump material from tank 60 back into tank 10 through the branch 90, 50 and 18. As soon as the level in tank 60 decreases, flow from the bottom of tank 10 will be resumed.

The by-pass 98 controlled by hand valve 100 is usually closed, but it is opened and valve 94 is closed when it is desired to clean out tank 60 and remove from the bottom undesirable accumulated and thin, unusable sludge which would otherwise drip through on the conveyor 70.

It will thus be seen that I have shown a system for depositing recovered particles from washed gas on a sinter mix in an extremely simple and relatively inexpensive apparatus.

The area required for the device is relatively small and there are no moving parts except for the pump, which is a standard element of any system. No expensive structures or foundations are required for the installation; and since there are no moving parts, no forced shut-downs will cause expensive delays in the operation of the sinter plant.

This application is a continuation-in-part of my copending application Serial No. 181,654, filed August 26, 1950, now abandoned.

What I claim is:

1. Apparatus for separating washed gas residue and feeding to a sinter mix which comprises a settling tank relatively high with respect to its horizontal dimension, an adjustable inlet pipe for said tank, means to locate said pipe at various positions to vary the vertical location of the inlet, a feeder tank, means forming a passage connecting the bottom of said first tank to an inlet pipe in said second tank, means at the bottom of said feeder tank to discharge thickened material directly onto a sinter mix, means forming a second passage between the tops of said tanks, and means to transfer material selectively and alternatively through said passages.

2. A device as defined in claim 1 in which means is provided to control the last means to transfer material through the second passage only in response to high liquid level in the feeder tank.

3. An apparatus for separating washed gas residue and feeding to a sinter mix, which comprises, a settling tank, means to feed water from a gas washer to the settling tank, a feeder tank, means to transfer sludge from the bottom of the settling tank to the feeder tank, comprising a pump and a piping system between said tank serving as inlet and outlet to said pump, by-pass passages connecting the tops of said feeder tank and settling tank, valve means controllable to reverse flow between said tanks to prevent overflow of said feeder tank and a second by-pass passage connecting the bottom of said feeder tank to the first by-pass to draw off thin sludge as the feeder tank is emptied.

4. Apparatus as defined in claim 3 in which level responsive means in said feeder tank actuates said valve means.

5. Apparatus as defined in claim 3 in which said by-passages comprise a conduit between the pump inlet and the top of the feeder tank and a conduit between the pump outlet and the top of the settling tank.

6. Apparatus as defined in claim 5 in which the valve means comprises a solenoid operated valve in the pump inlet, in the pump outlet, and in each conduit in the by-pass, and means to actuate said valves to reverse flow between said tanks in response to level in said feeder tank.

References Cited in the file of this patent

UNITED STATES PATENTS

| | | |
|---|---|---|
| 1,065,542 | Main | June 24, 1913 |
| 1,210,392 | Alpenfels | Jan. 2, 1917 |
| 1,737,007 | Ellis | Nov. 26, 1929 |
| 1,908,691 | Coe | May 16, 1933 |
| 1,979,169 | Mitchell | Oct. 30, 1934 |
| 1,986,913 | Anthony | Jan. 8, 1935 |
| 2,090,143 | Nonhebel et al. | Aug. 17, 1937 |
| 2,337,507 | Thayer | Dec. 21, 1943 |
| 2,363,176 | Gunz | Nov. 21, 1944 |
| 2,412,104 | Stewart | Dec. 3, 1946 |
| 2,499,057 | Cox et al. | Feb. 28, 1950 |
| 2,521,347 | Davis | Sept. 5, 1950 |
| 2,539,992 | Cover | Jan. 30, 1951 |

FOREIGN PATENTS

| | | |
|---|---|---|
| 117,586 | Great Britain | July 25, 1918 |
| 170,225 | Great Britain | Oct. 20, 1921 |